(12) United States Patent
Winter et al.

(10) Patent No.: US 6,434,481 B2
(45) Date of Patent: Aug. 13, 2002

(54) METHOD AND NAVIGATION SYSTEM FOR DISPLAY OF SECTIONS OF A DIGITAL MAP DATA BASE AS WELL AS AN IMPROVED OPERATING UNIT AND INTERFACE FOR SAME

(75) Inventors: Stephan Winter, Hannover; Bernd Hessing, Holle; Thomas Jung, Frankfurt; Walter Nordsiek, Holle; Olaf Binnewies; Thomas Fabian, both of Hildesheim; Bettina Rentel, Giesen; Dirk Otte, Laatzen; Dirk Tiemann, Hannover, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/742,734

(22) Filed: Dec. 20, 2000

(30) Foreign Application Priority Data

Dec. 30, 1999 (DE) .......................... 199 63 764

(51) Int. Cl.[7] ..................... G09B 29/00; G08G 1/0969; G01C 21/36
(52) U.S. Cl. ........................ 701/208; 701/211; 340/995
(58) Field of Search ................................. 701/208, 211, 701/212; 340/990, 995; 345/112, 113, 114

(56) References Cited

U.S. PATENT DOCUMENTS

| | | | | |
|---|---|---|---|---|
| 4,550,317 A | * | 10/1985 | Moriyama et al. | 340/988 |
| 4,660,037 A | * | 4/1987 | Nakamura | 340/988 |
| 5,204,817 A | * | 4/1993 | Yoshida | 283/34 |
| 6,240,360 B1 | * | 5/2001 | Phelan | 345/641 |

* cited by examiner

Primary Examiner—Michael J. Zanelli
(74) Attorney, Agent, or Firm—Michael J. Striker

(57) ABSTRACT

A method, operating unit, navigation system and interface for displaying a predetermined section of a digital map database, which represents a real geographic area, on a display device are described. The digital map database contains data representing various geographic elements. An attribute, which defines a display priority, is assigned to each geographic element. An evaluation is then performed to determine whether or not particular geographic elements in the predetermined section to be displayed should or should not be visible on the display device. A particular geographic element is made visible on the display device when it is located in the predetermined section and when its display-priority-determining attribute satisfies certain selection criteria or selection rules. This method prevents display of too many geographic elements, which would otherwise make the display congested thus producing an unclear display.

30 Claims, 2 Drawing Sheets

METHOD AND NAVIGATION SYSTEM FOR DISPLAY OF SECTIONS OF A DIGITAL MAP DATA BASE AS WELL AS AN IMPROVED OPERATING UNIT AND INTERFACE FOR SAME

BACKGROUND OF THE INVENTION

1. Field of the Invention

The present invention relates to a method of displaying sections of a digital map database, which are pictures or images of real geographic areas, the digital map database containing data regarding respective geographic elements. The present invention also relates to a digital map database, which is a representation of real geographic areas and which contains data regarding geographic formations and respective attributes for corresponding geographic elements. The present invention also relates to an operating unit of a navigation system with a display device for displaying sections of a digital map database, which are pictures or images of real geographic areas. The present invention relates further to a navigation system for a vehicle, especially a motor vehicle, with a navigation module, which makes a digital map database available, and with an operating unit connected with the navigation module, which has a display device for display of sections of the digital map database, especially for performing the above-mentioned process. In addition, the invention relates to an interface between a digital map database, which is a representation of real geographic areas and contains data of geographic elements, and to a display device for displaying sections of the digital map database.

2. Prior Art

Permanently installed navigation systems guide an operator of a vehicle, especially a motor vehicle, aircraft or ship, rapidly, simply and reliably to a desired destination, without requiring the operator to acquire and study map materials and arduously plan a route. For that purpose suitable navigation data, for example based on chart data, land map data or street map data, is available in the navigation system, for example, stored on CD-ROM as a digital map database. The navigation system uses, for example, a GPS (Global Positioning System) to ascertain its present location in order to calculate navigation advisory messages, which guide the operator to his or her destination. The navigation data includes, for example, data regarding streets and roads for a motor vehicle as well as geographic information, such as data regarding mountains, oceans, woods, cultivated regions, buildings or other topographic elements, or additional information, e.g. such as data regarding restaurants, hotels, worthy sites or the like.

The digital map database is essentially a representation of a real street network and a suitable geographic region. This information from the digital map database is displayed on a display device in an operating unit in order to inform the operator. The number of geographic features and the degree of detail appearing in the display is selected differently to obtain an easy-to-read, clear display in different situations. For example, only major highways are shown on an overview map. Residential street maps should contain details up to residential buildings. The selection of the map features to be displayed substantially effects the readability and visibility of map sections displayed on the basis of a digital map database. This selection of features for display is especially important for maps displayed in a vehicle, since an operator of the vehicle must be able to ascertain all required information for route guidance with as brief as possible a glance at the display device. The map display significantly cannot be set up according to a generally established rule, but a relative importance should be assigned to the different displayed elements. For example, an overview map of the Ruhr region may significantly contain only expressways or major highways. A map of Arizona in the same scale could also contain, in contrast, comparatively smaller roads.

In navigation systems for a motor vehicle it is significant that the navigation module, which accesses the digital map database is separate from the display device and is also displayed separately. Thus the navigation module requires a predetermined interface for accessing the digital map database. This interface must permit setting up a digital map in different scales on the display device that has sufficient clarity.

The interfaces for navigation systems are, for example, made by NAVTECH or ETAK Inc.. These interfaces provide access to the physical memory format of the digital map database. Generally different types of digital map databases are used in different vehicles. Furthermore access conflicts can occur during access by the navigation module, for example for internal route computation, and operating unit processing, for example for production of a display of sections of the digital map database on the display unit. Furthermore the elements contained in the digital map database are described as "direct", i.e. a highway or expressway is described as a street of the class "motorway" with a number. However it has been shown that standardization and agreement regarding classification of map elements is possible only to a very unsatisfactory degree which is unsuitable for display purposes.

It is not possible to perform an optimized pre-calculation of the important displayed elements for the respective display screen sections in the digital map database for every possible zoom stage and every possible display. Thus the operating unit must include means for deciding which elements should be shown and which elements should be suppressed during production of the display. The possible overlap of the displayed elements is an additional difficulty, which can occur, for example, with an island in an ocean. Also the relative overlap must be detected in the interface. Furthermore height or elevation information is generally not contained in the digital map database of a vehicular navigation system.

With the standard "direct" or absolute coded digital map according to the state of the art it is disadvantageous that the thinning out algorithms computed in the display device are operational only with certain physical data formats known in detail.

SUMMARY OF THE INVENTION

It is an object of the present invention to provide an improved method for displaying sections of a digital map database in a navigation system in a vehicle, which does not have the above-described disadvantages and which dynamically adjusts the display of the sections of the digital map database, i.e. to the respective actual requirements.

It is another object of the present invention to provide an improved navigation system with an improved operating unit for performing the improved method of displaying sections of a digital map database, which does not have the above-described disadvantages and which dynamically adjusts the display of the sections of the digital map database.

It is a further object of the present invention to provide an improved interface of the above-described type and an improved operating unit of the above-described type of the navigation system for performing the improved method.

It is an additional object of the present invention to provide an improved digital map database for the improved method of displaying predetermined sections of the database in a navigation system in a vehicle, which does not have the above-described disadvantages and which dynamically adjusts the display of the sections of the digital map database.

According to one aspect of the present invention the method of displaying a predetermined section of the digital map database, which represents a real geographic area, on a display device, the digital map data based containing map data representing geographic elements, includes a) selecting respective geographic elements for display according to the predetermined section of the digital map database to be displayed; and b) determining whether the respective geographic elements selected in step a) are associated with corresponding display-priority-determining attributes; and c) evaluating the display-priority-determining attributes of the respective geographic elements having the display-priority-determining attributes in the predetermined section to determine whether they should be actually visible in the display device, or not.

Furthermore the above-described method provides the advantage that an optimum "thinning out" of the displayed information occurs for the display screen contents for display of the predetermined section of the digital map database. The clarity of the instantaneous display is thus adjusted for various different views, e.g. by means of an algorithm.

Preferred embodiments of the method according to the invention have additional advantages.

According to preferred embodiments of the method a limiting value for the display-priority-determining attributes of the respective geographic elements to be actually displayed is dynamically established. The number of the geographic elements actually coinciding with the predetermined section determines this limiting value. Alternatively, the scale of the predetermined section determines the limiting value.

In preferred embodiments of the method respective value ranges for the display-priority-determining attributes of the geographic elements that determine whether or not the geographic elements are displayed or not are set up for the predetermined section to be displayed. Thus the method, for example, can display only expressways or major highway roads on the display device in the Ruhr region of Germany, while also displaying streets and roads with lower values of the display-priority-determining attributes on the display device in Arizona.

When relative overlap parameters (Z-level) are attributed to the respective geographic elements and the respective geographic elements are added to the predetermined section to be displayed one after the other in order of sequentially increasing relative overlap parameters, a realistic view of a geographic area can be preferably produced in spite of the absence of height information in the digital map database. For example an island can have a higher Z-level than the surrounding water. The water is then added to the predetermined section first and then the island is shown. Because of this aspect of the preferred embodiments of the method it is guaranteed that the island will be visible and not covered by the water.

The display-priority-determining attributes are either already associated with the geographic elements in the digital map database or in an interface connecting the digital map database and the display device.

The respective values of the display-priority-determining attributes of the geographic elements are preferably employed according to their relative magnitudes and not their absolute values.

According to another aspect of the present invention a digital map database is provided that represents real geographic areas. This digital map database includes data regarding respective geographic elements and corresponding attributes associated with the respective geographic elements. At least one part of the geographic elements is provided with respective additional display-priority-determining attributes defining corresponding display priorities for each of the at least one part of the geographic elements. The additional display-priority-determining attributes establish whether or not the geographic elements in the section of the digital map database to be displayed are actually visible or not on the display device.

The digital map database according to the invention has the advantage that an optimum "thinning out" of the visible information in the predetermined section to be displayed on the display device occurs. The clarity of the instantaneous display is thus adjusted for various different views, e.g. by means of an algorithm.

Advantageous features of the digital map database are provided in preferred embodiments.

Different parts of the digital map database can be thinned out differently for display by providing predetermined selection rules for the display-priority-determining attributes of the respective geographic elements that are associated with the respective different parts of the digital map database. The selection rules establish respective value ranges for the display-priority-determining attributes that determine whether or not the geographic elements in the predetermined section are visible on the display device. For example, then only expressways or major highway roads can be shown on the display device in the Ruhr region of Germany, while also streets and roads with lower values of the display-priority-determining attributes can be shown on the display device in Arizona.

A realistic display can be produced in spite of the omission of height information in the digital map database when relative overlap parameters (Z-level) are attributed to the respective geographic elements in the digital map database. If the respective geographic elements in the predetermined section are now made visible on the display device in order of increasing Z-level, the above-mentioned realistic reproduction of the appearance of a selected geographic area is produced. For example, if an island has a higher Z-level than the surrounding water, then the island will be shown after the water. Thus it is guaranteed that the island it will not be covered or obscured by the water.

According to another aspect of the present invention an operating unit is provided that includes means for evaluating display-priority-determining attributes of the respective geographic elements. The means for evaluating display-priority-determining attributes of the geographic elements establish whether the respective geographic elements in the predetermined section are visible in the display, or not. This determination is made according to the predetermined section of the map database to be displayed and according to the display-priority-determining attributes.

This feature of the operating unit has the advantage that an optimum "thinning out" of the display screen contents for display of the predetermined section of the digital map database occurs. Thus the clarity of the instantaneous display is adjusted for different views, for example by means of a suitable algorithm.

Preferred embodiments of the operating device have various additional advantages.

In a preferred embodiment of the operating device according to the invention the means for evaluating display-priority-determining attributes includes means for determining a limiting value for the display-priority-determining attributes of the respective geographic elements to be actually displayed dynamically. This limiting value depends on the number of the geographic elements in the predetermined section of the map database or on the scale of the predetermined section, so that only those geographic elements in the predetermined section having display-priority-determining attributes above the limiting value are actually displayed.

A different thinning out for different parts of the map database can be produced when the means for evaluating display-priority-determining attributes includes means for associating respective value ranges of the display-priority-determining attributes with displaying the geographic elements in the predetermined section visible, or not, on the display device. For example, then only expressways or major highway roads can be shown on the display device in the Ruhr region of Germany, while also streets and roads with lower values of the display-priority-determining attributes can be shown on the display device in Arizona.

A realistic display can be produced in spite of the omission of height information in the digital map database when relative overlap parameters (Z-level) are attributed to the respective geographic elements in the digital map database. If the respective geographic elements in the predetermined section are now made visible on the display device in order of increasing Z-level, the above-mentioned realistic reproduction of the appearance of a selected geographic area is produced. For example, if an island has a higher Z-level than the surrounding water, then the island will be shown after the water. Thus it is guaranteed that the island it will not be covered or obscured by the water.

Furthermore the navigation system of the above-described kind for performing the method according to the invention contains the above-described digital map database and the operating unit.

These features provide the advantage that an optimum "thinning out" of the visible information in the predetermined section to be displayed on the display device occurs. The clarity of the instantaneous display is thus adjusted for various different views, e.g. by means of an algorithm.

Various advantages are provided by preferred embodiments of the navigation system according to the invention.

In a preferred embodiment the navigation system includes a navigation module that stores the digital map database on a data-recording medium or that retrieves currently required data from a digital map database by means of a data connection, especially a radio connection, from a location outside of the navigation system.

Means for incorporating and retaining actual traffic information in the data taken from the digital map database for navigation, especially by means of RDS-TMC, is preferably provided in the navigation system for consideration of the actual continuously changing traffic situation for display and route calculation.

According to another aspect of the present invention an interface is provided that connects a digital map database and display means for displaying a predetermined section of the digital data base representing actual geographic areas and containing data regarding the respective geographic elements. The interface includes means for associating corresponding display-priority-determining attributes with the respective geographic elements during transfer of map data from the digital map database to the display means. The display-priority-determining attributes establish whether or not individual respective geographic elements in the predetermined section of the digital database are made visible or not in the display means in accordance with the predetermined section to be displayed.

This has the advantage that an optimum "thinning out" of certain display screen contents for display of the predetermined section of the digital map database takes place. The clarity of the instantaneous display is thus adjusted for various different views, e.g. by means of an algorithm.

This interface preferably includes means for connecting an operating unit of the display means and a navigation module of a navigation system with each other.

The geographic elements include, among others, streets and roads for motor vehicles, mountains, oceans, woods, buildings, restaurants, hotels or sites. The attributes of the geographic elements include, for example, travel direction, speed or street signs for the streets and roads. Furthermore the geographic elements of the digital map database are appropriately stored as data on a data-bearing medium, especially a CD-ROM.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
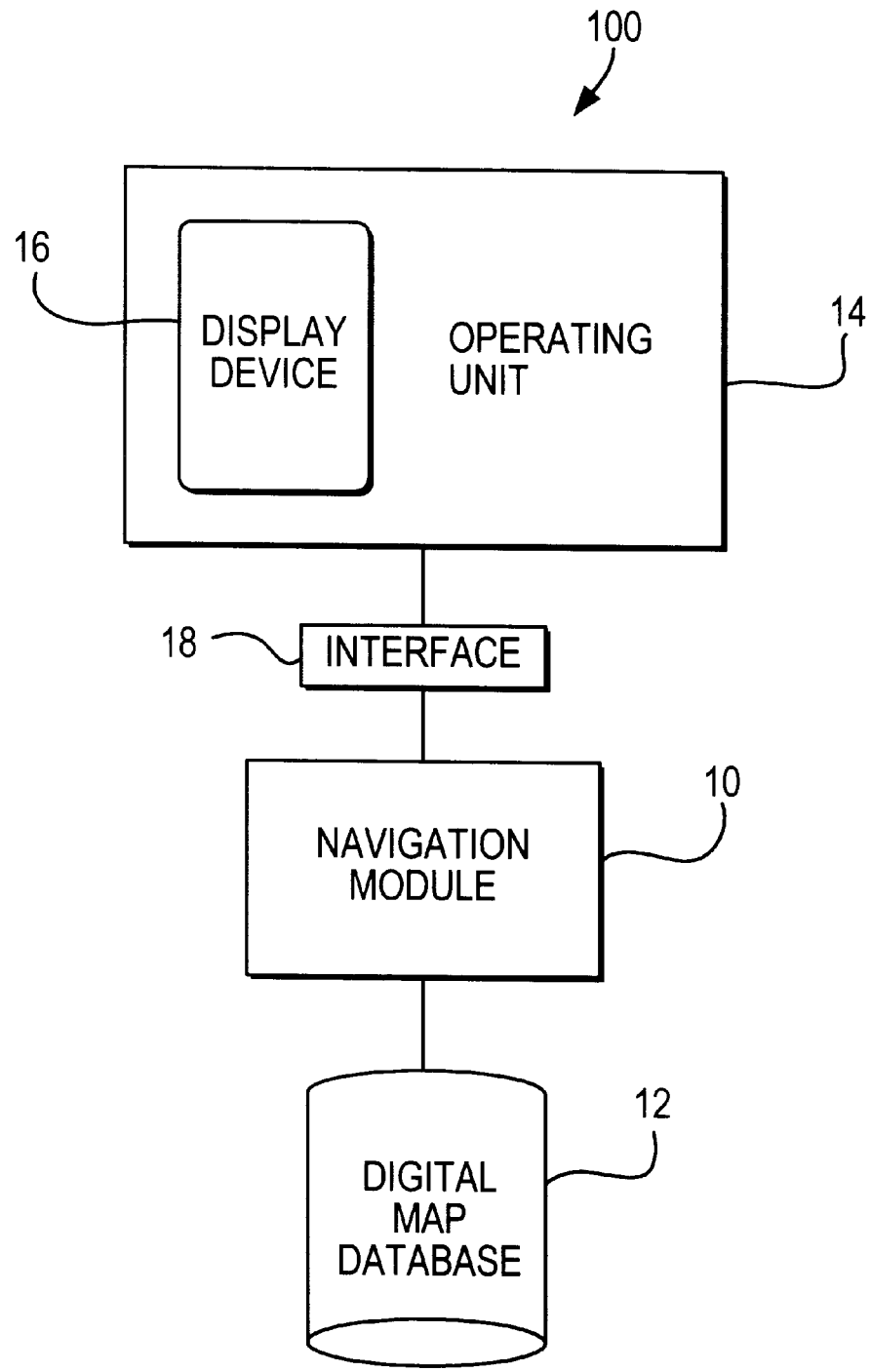
FIG. 1 is block diagram of a part of a navigation system according to the invention.

The navigation system 100 shown in FIG. 1 comprises a navigation module 10 with a digital map database 12 and an operating unit 14 with a display device 16, for example an LCD-flat display screen. An interface 18 connects the operating unit 14 and the navigation module 10.

All display elements are provided with a display-priority-determining attribute for the relative "importance" of the display element in the interface 18 for accessing the digital map 12. The term "display element" means any geographic element of the digital map database 12, such as a streets, road, mountain, ocean, island or wood, as well as an additional element, such as a hotels, a worthy site, a restaurant or the like.

This attribute specifying "importance" is actually given by the manufacturer of the digital map database 12. It is not objectively measured during the data inquiries.

This attribute, can be evaluated in the operating unit 14, together with other criteria, in order to permit an optimum "thinning out" of the display screen content for display of portions of the digital map 12.

The manufacturer of the digital map database 12 can, for example, provide highways with a one-place number with a comparatively high importance or display priority and highways with three-place numbers with a comparatively lower importance or display priority. In another potion of the digital map database an especially important national or state roadway, for example, can be provided with a higher priority than a shorter highway. By giving the relative priorities or display priorities as attributes of the "importance" then a thinning-out algorithm can be provided by the manufacturer, which controls the digital map data base 12.

The display elements from a digital map, as already mentioned, are provided with relative weightings to permit the correct generation of the displayed map data on different display screens and in different scales. These relative weightings of the displayed elements are used by the operating unit 14 in order to produce a thinning out effect during a scale change or a change to another section of the digital map database. The advantage of the relative weightings is that the criteria for allocating the weighting factors can be produced by the maker of the digital map database 12 with the help of arbitrary controls and need not be known in the operating unit 14.

The method of relative weighting or prioritizing is applicable to all display elements of a digital map database 12. No agreement regarding the attributes is necessary. Furthermore the relative weightings can be added later to the input digital map database 12. The relative weightings can also be added subsequently to the input display elements. Standardization of the display elements is not required.

The method can also be used with all interfaces 18 for the digital map database 12. This interface 18 is advantageously arranged between the navigation module 10 and the operating unit 14 in the vehicle. However it is possible to provide a wireless interface 18 between the vehicle and data infrastructure (telematic) by means of a wireless data connection. The data does not necessarily need to be stored on data recording media. Furthermore street data can be stored on a CD with some weighting factors. Additional information in the form of traffic data may be provided, for example, by means of RDS-TMC, and data regarding routes are, for example, produced in the navigation system itself. The method according to the invention is useable for all these data.

Also a relative overlap parameter (Z-level) can also be associated with the data. The overlap parameter specifies which display elements should be shown in the display over other display elements. An island, for example, is assigned a higher Z-level parameter than the water. The display device 16 then produces the element with the lower Z-level parameter first and then subsequently the element with the higher Z-level parameter. Because of that it is possible to produce nearly realistic displays of map data without exact height information.

The aforementioned "Z-level" can be integrated in the weighting factors, since, for example, the island has a higher weighting factor than the water. An algorithm can be provided in the operating unit 14, which first displays the display elements with the lower weighting factor and, after that, the display elements with the higher weighting factor. It is understandable that not erroneously correlated display elements, for example, an island and water, are separated from each other by their weighting factors, so that they are not displayed together with their weighting factors in the operating unit 14. In so far as an association of areas of importance or weighting factors and the states "display" and "do not display" occurs in the operating unit 14, the associated display elements, such as islands and water, should be correlated with the same weighting parameter range.

Respective relative magnitudes of the display priorities are preferably used in the display sections 20,22,24 and their absolute values are not used. This should be subsequently more understandable with the aid of FIGS. 2 to 4. These figures show first, second and third displayed sections 20, 22 and 24 of the map database, subsequently called display screen sections. An A-city 26 having a priority parameter value of four, a B-city 28 having priority parameter value of three, a C-city 30 having a priority parameter value of four and a D-city with a priority parameter value of three are shown in the display screen sections 20, 22, and 24. The four cities 26, 28, 30 and 32 are combined with different priority values in the digital map in three scenes.

Figure 2:
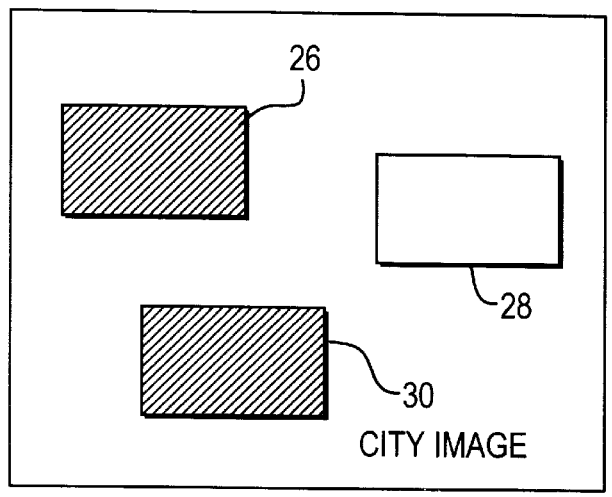
FIG. 2 is a plan view of a first section of a digital map database shown in an exemplary display prepared according to the method of the invention.
Figure 3:
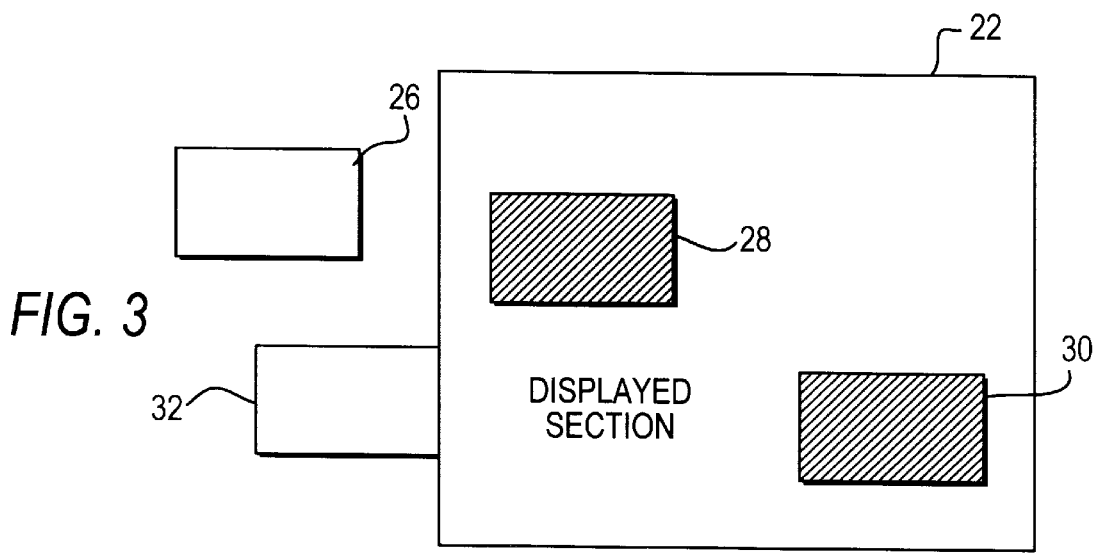
FIG. 3 is a plan view of a second section of a digital map database in an exemplary display prepared according to the inventive method.
Figure 4:
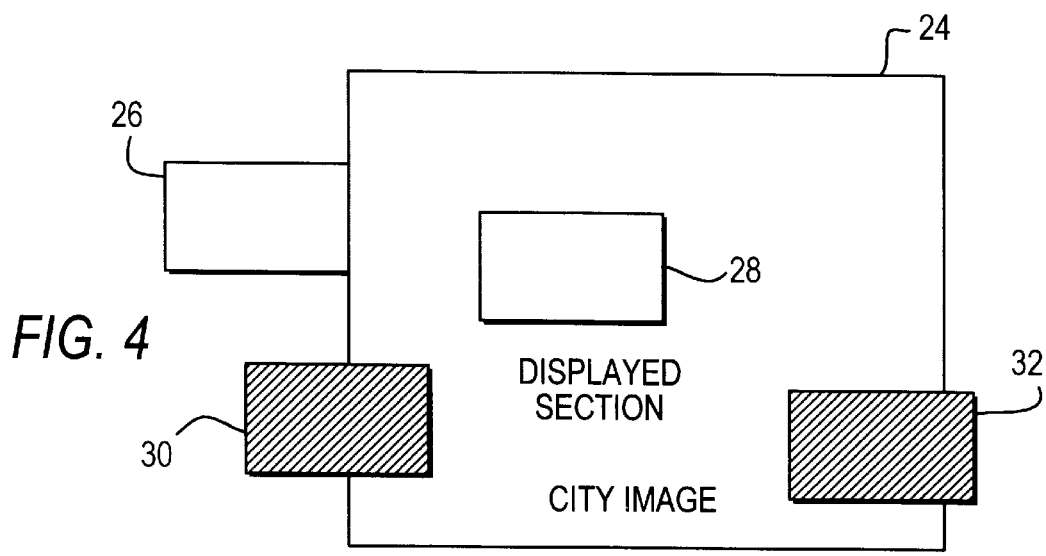
FIG. 4 is a plan view of a third section of a digital map data base in an exemplary display prepared according to the method of the invention.

Two selection principles or rules, which were not previously defined for the digital map database, are now used by the display device. These selection rules state that only two cities may appear in a single display screen section 20,22, 24 and the congestion of cities in a display screen section 20,22,24 should be minimized. These principles mean that not all cities near each other in a display screen section should be displayed, but only those cities should be shown which are furthest from each other so that the illustrated cities are distributed as uniformly as possible on the display screen section 20, 22,24. In the illustrations of FIGS. 2 to 4 the city or cities that are actually shown on the display screen are indicated with shading. The boxes without shading show the corresponding city or cities that are not displayed.

In the first display section 20 according FIG. 2 this leads to a relative rating of all the cities 26, 28 and 30 present in the section for suppression of the city with the lowest priority value, namely the B-city 28. In the second section according to FIG. 3 lesser cities 28 and 30 are displayed. In the third section 24 according to FIG. 4 there are two candidates with the same display priority "matching candidates", namely B-city 28 and D-city 32. With cities having the same priority parameter values the principle "minimize the congestion of cites within the display section 24" is employed. Thus in this latter case the B-city is suppressed.

The disclosure in German Patent Application 199 63 764.4 of Dec. 30, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method, operating unit, navigation system and interface for display of sections of a digital map database, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of displaying a predetermined section of a digital map database, which represents a real geographic area, on a display device, the digital map database containing map data representing geographic elements, said method comprising the steps of:

a) selecting respective geographic elements for display according to the predetermined section of the digital map database to be displayed; and b) determining whether the respective geographic elements selected in step a) are associated with corresponding display-priority-determining attributes; and c) evaluating the display-priority-determining attributes of the respective geographic elements having the display-priority-determining attributes to determine whether the respective geographic elements in the predetermined section should be actually visible in the display device, or not.

2. The method as defined in claim 1, wherein a number of the geographic elements coincide with or overlap the predetermined section and the predetermined section has a predetermined scale; and further comprising dynamically establishing a limiting value for the display-priority-determining attributes of the respective geographic elements to be actually visible, said limiting value depending on the number of the geographic elements coinciding with the predetermined section or on the predetermined scale of the predetermined section, and actually displaying only ones of the geographic elements having values of the display-priority-determining attributes above the limiting value.

3. The method as defined in claim 1, further comprising associating corresponding value ranges of the display-priority-determining attributes with displaying and not displaying the respective geographic elements.

4. The method as defined in claim 1, further comprising attributing corresponding relative overlap parameters (Z-level) to the respective geographic elements and displaying the respective geographic elements in the predetermined section one after the other in order of sequentially increasing relative overlap parameters.

5. The method as defined in claim 1, wherein the geographic elements include streets for motor vehicles, roads for motor vehicles, mountains, oceans, woods, buildings, restaurants, hotels and sites.

6. The method as defined in claim 1, wherein the display-priority-determining attributes of the geographic elements include respective travel directions, speed limits or street signs for roads and streets.

7. The method as defined in claim 1, further comprising storing the geographic elements of the digital map database as data on a data-recording medium.

8. The method as defined in claim 1, wherein the display-priority-determining attributes are already correlated with geographic elements in the digital map database or are correlated with the geographic elements in an interface provided between the digital map database and the display device.

9. The method as defined in claim 1, wherein relative magnitudes, not absolute values, of the display-priority-determining attributes are employed for selecting the geographic elements to be visible on the display device.

10. The method as defined in claim 1, further comprising providing at least one additional attribute for deciding whether or not to display individual ones of the respective geographic elements in the predetermined section.

11. A digital map database (12) representing real geographic areas, the digital map database (12) including data regarding respective geographic elements and corresponding attributes correlated with the respective geographic elements, wherein at least one part of the geographic elements is provided with respective additional display-priority-determining attributes defining corresponding display priorities for said at least one part of the geographic elements, the additional display-priority-determining attributes determining whether or not the geographic elements in a predetermined section of the digital map database are actually visible or not on the display device.

12. The digital map database (12) as defined in claim 11, wherein respective selection rules for the additional display-priority-determining attributes are provided which correlate with certain regions of the digital map data base, said selection rules establishing respective value ranges for the additional display-priority-determining attributes for which geographic elements having the additional display-priority-determining attributes within said value ranges should or should not be visible.

13. The digital map database (12) as defined in claim 11, wherein the respective geographic elements are stored as data on a data-recording medium.

14. The digital map database (12) as defined in claim 11, wherein the geographic elements include streets for motor vehicles, roads for motor vehicles, mountains, oceans, woods, buildings, restaurants, hotels and sites.

15. The digital map database (12) as defined in claim 11, wherein the additional display-priority-determining attributes of the geographic elements include respective travel directions, speed limits or street signs for roads and streets.

16. The digital map database (12) as defined in claim 11, further comprising respective relative overlap parameters (Z-level) attributed to the geographic elements.

17. An operating unit (14) for a navigation system (100) comprising a display device (16) for display of a predetermined section of a digital map database (12), said predetermined section representing a real geographic area, the digital map database (12) including map data regarding respective geographic elements, said operating unit (14) comprising means for evaluating display-priority-determining attributes of the respective geographic elements, said means for evaluating display-priority-determining attributes of the respective geographic elements determining whether the respective geographic elements are visible or not in the predetermined section according to the predetermined section and according to the display-priority-determining attributes.

18. The operating unit (14) as defined in claim 17, wherein the means for evaluating display-priority-determining attributes includes means for determining a limiting value for the display-priority-determining attributes of the respective geographic elements to be actually displayed dynamically according to a number of the geographic elements in the predetermined section or according to a scale of the predetermined section, so that only ones of the geographic elements having display-priority-determining attributes above the limiting value are actually displayed.

19. The operating unit (14) as defined in claim 17, wherein the means for evaluating display-priority-determining attributes includes means for correlating respective value ranges of the display-priority-determining attributes with displaying and not displaying the respective geographic elements.

20. The operating unit (14) as defined in claim 17, wherein corresponding relative overlap parameters (Z-level) are attributed to the respective geographic elements and the means for evaluating display-priority-determining attributes includes means for displaying the respective geographic elements in the predetermined section on the display device one after the other in order with the relative overlap parameters thereof sequentially increasing.

21. The operating unit (14) as defined in claim 17, wherein the geographic elements include streets for motor vehicles, roads for motor vehicles, mountains, oceans, woods, buildings, restaurants, hotels and sites.

22. The operating unit (14) as defined in claim 17, wherein the display-priority-determining attributes of the respective geographic elements include respective travel directions, speed limits or street signs for roads and streets.

23. The operating unit (14) as defined in claim 17, further comprising means for storing the respective geographic elements of the digital map database (12) as data on a data-recording medium.

24. A navigation system (100) for vehicles including motor vehicles, said navigation system comprising a navigation module (10) including means for preparing a digital map database (12) and an operating unit (14) connected with the navigation module (10), said operating unit (14) having a display device (16) for displaying a predetermined section of the digital map database (12), said predetermined section representing a real geographic area;

wherein the digital map database (12) includes data regarding respective geographic elements and corresponding attributes correlated with the respective geographic elements, wherein at least one part of the geographic elements is provided with corresponding additional display-priority-determining attributes defining corresponding display priorities for said at least one part of the geographic elements, the display priorities determining whether or not the geographic elements in the predetermined section of the digital map database are actually visible or not on the display device (16); and wherein the operating unit (14) comprises means for evaluating the corresponding additional display-priority-determining attributes of the respective geographic elements, said means for evaluating the corresponding additional display-priority-determining attributes of the respective geographic elements determining whether the respective geographic elements are visible or not in the predetermined section according to the predetermined section and according to the additional display-priority-determining attributes.

25. The navigation system (100) as defined in claim 24, wherein the navigation module (10) includes means for retrieving map data from a digital map database (12) stored on a data-recording medium or means for establishing a data link for obtaining the digital map database (12).

26. The navigation system (100) as defined in claim 25, wherein said data link is a radio link establishing a connection to an externally located database device.

27. The navigation system (100) as defined in claim 25, wherein said means for establishing said data link includes means for receiving and integrating actual traffic information with the data from the digital database (12).

28. The navigation system (100) as defined in claim 27, wherein said means for receiving said actual traffic information receives said traffic information by means of RDC-TMC.

29. An interface (18) connecting a digital map database (12) and display means (14,16) for displaying a predetermined section of the digital data base (12), said digital database (12) representing actual geographic areas and containing data regarding respective geographic elements, said interface (18) including means for associating corresponding display-priority-determining attributes with the respective geographic elements during transfer of map data from the digital map database to the display means, said display-priority-determining attributes establishing whether or not individual ones of the respective geographic elements in the predetermined section of the digital database (12) are made visible or not in the display means in accordance with the predetermined section to be displayed.

30. The interface (18) as defined in claim 29, comprising means for connecting an operating unit (14) of the display means (14,16) and a navigation module (10) of a navigation system (100) with each other.

* * * * *